UNITED STATES PATENT OFFICE

HANS CARSTENS, OF LEVERKUSEN, NEAR COLOGNE-ON-THE-RHINE, AND GERHARD KRÖNER, OF COLOGNE-ON-THE-RHINE, GERMANY, ASSIGNORS TO I. G. FARBENINDUSTRIE AKTIENGESELLSCHAFT, OF FRANKFORT-ON-THE-MAIN, GERMANY

DECOLORIZING SILICIC ACID

No Drawing. Application filed March 19, 1926, Serial No. 96,051, and in Germany May 4, 1925.

If a silicic acid sol which contains a sufficient excess of acids is allowed to coagulate to a gel and this gel is dried after a thorough washing, a solid silicic acid gel of a fine porous structure is obtained which can be used as a decolorizing agent only if it is very finely ground. It is often desirable and advantageous to use silicic acid gel in a granular form for the purification and decolorization of organic liquids and when used for this purpose the silicic acid gel must contain large pores.

We have made the surprising discovery that such a decolorizing silicic acid is obtained when silicic acid jellies coagulated by means of acid are treated with solutions of alkaline agents in such quantity that the solution remains permanently slightly alkaline in contact with the jelly. These jellies are then thoroughly washed until the neutral salts have been removed and they are then dried. The silicic acid gel obtained in this manner contains large pores and its adsorption power is completely utilized when it is used in granular form for decolorization or for the adsorption of dissolved substances. The product obtained can be used, for example, for the decolorization of mineral oil products or wool fat.

This method of working possesses the great advantage that it enables the employment of such processes for the manufacture of active silicic acid, viz. for use in decolorizing, which cannot be used for the production of silicic acid, precipitated in alkaline solution. A process of the kind in question is for example described in U. S. application Ser. No. 731,470 filed on August 11, 1924 in the name of Müller and Carstens according to which insoluble silicates serve as starting materials for the manufacture of silicic acid gel.

In our new process the alkaline acting media may be applied either before or after washing the precipitated jelly. The latter may also be partly dehydrated by pressure or by drying before or after the application of the substances exerting an alkaline action.

The following examples will serve to illustrate our invention:—

*Example 1.*—On mixing water glass with acid a silicic acid sol is obtained. After the solidification of the sol the gel produced is finely broken up and then treated with a solution of sodium carbonate which, for example, contains slightly more sodium carbonate than is necessary for the complete neutralization of the excess acid contained in the gel. When the reaction is complete the product is washed and dried in the customary manner. A gel is obtained which is suitable for the purification and decoloration of organic liquids whereas without the subsequent treatment with the alkaline acting agent no decolorizing silicic acid results.

Or, the gel obtained by mixing acid and water glass may first be washed until the acid reaction has disappeared and then treated with a solution or sodium carbonate. By this means a considerable economy in alkali is effected, as after sufficiently good washing operations the amount of sodium carbonate required may be very much reduced.

The sodium carbonate may obviously be replaced by other alkaline acting agents, as for example by caustic soda solution, ammonia, water glass, other alkaline salts, organic bases or the like.

*Example 2.*—20 parts by weight of slag sand are introduced into a mixture of 50 parts by weight of hydrochloric acid, 1.15 sp. gr., and 50 parts by weight of ice. A silicic acid sol results. Due to the heat of solution the temperature of the mixture rises to about 50° C. After the dissolving is completed the mixture is cooled and filtered. The sol after a time coagulates to a gel.

The resulting product is first subjected to pressure in order to remove a great part of the liquid. It is then washed and treated for some time with a very dilute solution of water glass again washed and dried in the customary manner.

A gel thus obtained, which possesses the same properties as those of the product of Example 1.

We claim:—

1. A process of preparing an adsorptive silicic acid gel from a silicic acid jelly precipitated from acid solution, which comprises treating said jelly with a solution containing a quantity of an alkaline agent sufficient only to insure that the solution in contact with the jelly remains permanently alkaline, and then washing and dehydrating the jelly.

2. A process of preparing an adsorptive silicic acid gel from a silicic acid jelly precipiated from acid solution, which comprises treating said jelly with a solution containing a quantity of sodium carbonate sufficient only to insure that the solution in contact with the jelly remains permanently alkaline, and then washing and dehydrating the jelly.

3. A process of preparing an adsorptive silicic acid gel from a silicic acid jelly precipitated from acid solution, which comprises partially dehydrating the jelly, then washing it, treating it with a solution containing a quantity of an alkaline agent sufficient only to insure that the solution in contact with the jelly remains permanently alkaline, washing again directly after treating with said alkaline agent and then dehydrating the jelly.

4. A process of preparing an adsorptive silicic acid gel from a silicic acid jelly precipitated from acid solution, which comprises treating said jelly with a solution containing a quantity of an alkaline agent sufficient only to insure that the solution in contact with the jelly remains permanently alkaline and washing the jelly while the latter is charged with alkaline agent, and drying.

5. An adsorptive silicic acid gel containing a small amount of an alkaline agent, said gel being obtained by the process defined in claim 1.

6. An adsorptive silicic acid gel containing a small amount of sodium carbonate, said gel being obtained by the process defined in claim 2.

In testimony whereof we hereunto set our hands.

HANS CARSTENS.
GERHARD KRÖNER.